United States Patent Office 3,411,796
Patented Nov. 19, 1968

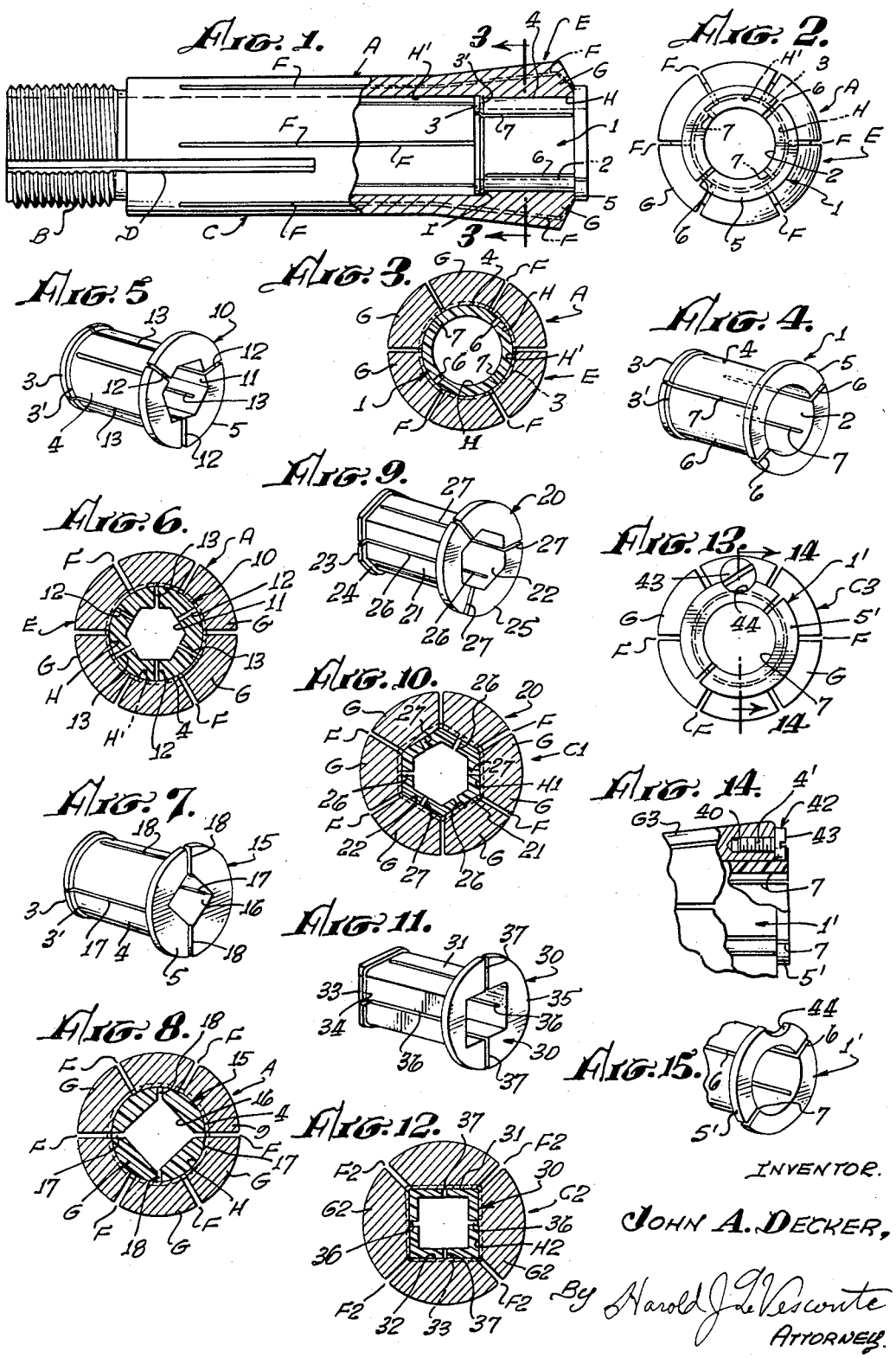

3,411,796
WORKPIECE GRIPPING BUSHING
John A. Decker, 10559 Pinyon Ave.,
Tujunga, Calif. 91042
Filed June 17, 1966, Ser. No. 558,355
8 Claims. (Cl. 279—46)

This invention relates to machine tool accessories and more particularly to a novel means for adapting the work-holding collet of a machine tool and which may be either a draw collet or a push collet, for use on workpieces having a micro finish or other surface characteristics which must be preserved in subsequent machining operations.

The principal objects of the invention are: to provide a bushing formed of a material incapable of marring a workpiece surface engaged thereby; which is readily inserted in the workpiece-holding opening of a collet; is self-retaining in the collet unless intentionally removed; is self-collapsing and self-expanding to accommodate the work-gripping action and work-releasing action of the collet jaws in which it is inserted; is economical to manufacture; and is effective and reliable for its intended purpose.

With the foregoing objects in view, together with such other objects and advantages as may subsequently appear, the invention resides in the provision of a collapsible, resilient bushing element insertable in the collet of a machine tool as described in the following specification of certain presently preferred embodiments of the invention, reference being had to the accompanying drawings which form a part of said specification and in which drawings:

FIG. 1 is a side elevational view showing, by way of example, a typical draw collet for a machine tool, a portion of the collet being broken away to show the installation therein of a work-gripping bushing constituting one presently preferred embodiment of the invention, FIG. 2 is an end elevational view of the combined collet and bushing as viewed from the right hand end of FIG. 1, FIG. 3 is a transverse sectional view taken on the line 3—3 of FIG. 1, FIG. 4 is a perspective view of the work-gripping bushing shown in the preceding figures and constituting the first embodiment of the present invention, FIG. 5 is a perspective view similar to FIG. 4 but showing a bushing which is adapted for installation in the collet of FIG. 1 but formed to hold a hexagonal workpiece.

FIG. 6 is a section taken as on the line 3—3 of FIG. 1 as that section would appear with the bushing of FIG. 5 installed in the collet.

FIG. 7 is a perspective view like FIG. 5 but showing a bushing adapted to hold a square workpiece, FIG. 8 is a section taken as on the line 3—3 of FIG. 1 as that section would appear with a bushing of FIG. 7 installed in the collet, FIG. 9 is a perspective view of a bushing for holding a hexagonal workpiece but which is adapted for insertion in a collet which is itself particularly adapted for holding a hexagonal workpiece, FIG. 10 is a section taken as on the line 3—3 of FIG. 1 as that figure would appear if the bushing of FIG. 9 were installed in a collet adapted to hold hexagonal workpieces, FIG. 11 is a perspective view of a bushing for holding a square workpiece adapted for insertion into a collet particularly adapted for holding square workpieces, FIG. 12 is a transverse sectional view as on the line 3—3 of FIG. 1, but showing the relation of the parts as they would appear if the bushing of FIG. 11 were employed in a collet having a square workpiece engaging surface, FIG. 13 is a front elevation of a collet showing a bushing keyed to the front end face of the collet to prevent relative rotation between the collet and the work-gripping bushing, FIG. 14 is a fragmentary sectional view taken on the line 14—14 of FIG. 13, and FIG. 15 is a fragmentary perspective view of the front flange end of the bushing shown in FIGS. 13 and 14.

Referring to the drawings and particularly first to FIGS. 1–4, there is shown a conventional spring collet A for holding circular workpieces, the illustrated collet being a draw collet and comprising a tubular hardened steel body having an exteriorly threaded inner end B, a slightly larger cylindrical body portion C provided with a kay way D adapted to engage a complementary key means in the sleeve of the machine tool spindle in which the collet is employed. The outer surface of the collet adjacent the opposite end thereof is of frusto-conical configuration as at E with the larger end constituting the outer end or nose of the collet and said outer end is provided with a plurality of radial slots F extending almost to the threaded end and forming the major portion of the length of the collet into a plurality of jaws G. In the form of collet shown in FIGS. 1, 2, 3, 6, 8, 13 and 14, the outer end of the interior of the collet is formed as a circular bore H of less diameter than the remainder of the bore H' through the body, said lesser diameter bore constituting the workpiece engaging surface of the collet and combining with the bore H' to form a shoulder I within the collet to which further reference will be made. The outer conical surface E engages a complementary surface in the machine tool spindle and then the collet is drawn into the spindle by means engaging the threaded end B, the jaws moved inward radially and gripping a workpiece or the like held in the bore H. All of the foregoing description is that of a conventional work-holding collet for machine tools and forms no part except as it constitutes a holding means, for the present invention. As stated in the first paragraph of this specification the collet may be either a draw collet or a push collet, both forms being common in machine tool construction and it will also be understood that the connection for the operating means for effecting workpiece gripping and releasing movements of the collet may be any of those commonly employed and that the threaded end B is merely illustrative of the fact that some means is connected to the collet for that purpose.

An example of the first embodiment of the invention is shown in perspective in FIG. 4 and constitutes a bushing intended to grip a cylindrical workpiece and to be carried in the cylindrical workpiece-holding bore H of a collet. As here shown, this embodiment of the invention comprises a short tubular member 1 preferably formed of a suitable resilient plastic or a comparably resilient soft metal as, for example, a suitable brass or copper alloy, or, alternatively, a harder resilient metal having a workpiece engaging surface formed of plastic, rubber or softer, non-resilient metal, the only required characteristics being that it be sufficiently resilient to remain engaged in a collet in which it is inserted and to release gripping engagement with a workpiece upon release of the collet from causing it to grip a workpiece held in the tubular member, hereinafter referred to as a "bushing." The body of the bushing accordingly has an outer diameter preferably closely fitting the bore H of the collet when the collet is opened and an inner diameter which is complementary to the external diameter of the workpiece surface to be engaged by the inner surface 2 when the collet is closed. At its inner end, this body portion is formed with an external peripheral rib 3 adapted to engage the collet shoulder I, the side of the said rib adjacent to the shoulder sloping outwardly from the collet bore engaging surface 3 as at 3' to facilitate removal of the sleeve from the collar. The outer end of the sleeve is formed as an annular flange 5 which engages the outer end of the collet and combines with the rib 3 to retain the sleeve in the collet unless intentionally removed therefrom. To permit the sleeve to be compressed into gripping engagement with a workpiece by constriction of the collet, the body is formed into a series of jaws by two series of longitudinally extending slits comprising a first plurality of slits 6 extending from the outer end and flange 5 to a point adjacent the rib 3 and arranged in alternation with an equal number of a second plurality of slits 7 extending through the rib 3 and the body portion and terminating adjacent to the flange 5. The last identified slits additionally, permit the inner end of the bushing to be momentarily compressed as an incident to being inserted into the collet or as an incident to the intentional removal of the bushing from the collet.

The operation of the bushing is believed to be obvious. Upon insertion in a collet, the alternately arranged slits 6 and 7 permit the body portion of this bushing to be compressed into tight gripping engagement with a workpiece held therein by the collet without damage to the surface of the workpiece, it being understood that for any given size of workpiece a suitable bushing to accommodate the diameter of the workpiece and the diameter of the work-holding bore of the collet would be employed. Upon release of gripping pressure by the collet, the resilience of the bushing material would cause it to expand to the extent permitted by the collet with resultant release of the workpiece held thereby.

Referring next to FIGS. 5 and 6, there is shown a bushing 10 which is generally similar to the bushing 1 in that it includes the cylindrical outer body surface 4 terminating at one end in the inner peripheral rib 3 having the tapered surface 3' and at the other end having the outer flange 5. Since these features are the same as the corresponding features in the first described form of the invention, they have been given the same numbers.

The bushing differs in that the work-holding bore 11 thereof is of hexagonal configuration for holding workpieces of corresponding configuration. Accordingly, the longitudinal slits corresponding to the slits 6 and 7 of the first described form are increased to six comprising three slits 12 extending from the inner end to a point adjacent the flange 5 and arranged in alternation with three slits 13 extending from the front end of the bushing through the flange 5 and terminating in close proximity to the rib 3. These slits may be disposed as shown at the centers of the respective flat sides of the hexagonal bore 11 or, if desired, may be disposed at the corners formed by the sides of that bore as may be preferred. The operation is, of course, identical with that of the first described form of the invention. Compression of the collet jaws on the bushing will cause the bushing to grip a workpiece held in the hexagonal bore 11.

FIGS. 7 and 8 show a third form of the invention comprising a bushing 15 generally similar to the bushings 1 and 10 including the cylindrical body 4 terminated at one end by the peripheral rib 3 with its sloping face 3' and at the other end terminating in the flange 5. It differs from the preceding bushings in that the work-holding bore comprises a square bore 16 and in having a first pair of longitudinally extending slits 17 which extend from the inner end to a point adjacent the flange 5 alternately arranged with a second pair of slits 18 extending through the flange and terminating adjacent the rib 3. These slits 17 and 18 are shown as being disposed at the corners of the square bore or work-receiving opening 16, but as suggested by the showing in FIG. 6, these slits could, of course, be disposed at the medial widths of the sides of the bore 16.

FIGS. 9 and 10 illustrate a form of a second embodiment of the invention which is generally like the forms shown in FIGS. 5 and 6 in that it is intended to grip a hexagonal workpiece but which differs in that the outer surface of the bushing 20 is adapted to be used in connection with a work-holding draw collet having a hexagonal work-holding bore H1. Since the slits forming the collet jaws and the jaws themselves (except for the work-gripping surfaces thereof) are the same as shown in all of the preceding figures, the same identifying letters F and G have been applied thereto.

The bushing 20 includes a hexagonal body 21 defining a hexagonal work-holding bore 22 disposed in axial alignment therewith and said body terminates in a hexagonal rib 23 having sloping faces 24 corresponding to the sloping face 3' of the previously described forms of the first embodiment of the invention and said body terminates in an outer flange 25 which corresponds to the flange 5 of the preceding forms of the invention. The bushing is divided into jaw segments by a first series of longitudinal slits 26 extending from the inner end of the bushing to a point adjacent the flange 25, said slits being alternately arranged with a second series of slits 26 extending through the flange 25 and terminating adjacent to the rib 24. These slits may be arranged either at the corners of the hexagonal bore or at the midwidth of the alternate faces thereof as may be desired.

FIGS. 11 and 12 show a bushing 30 having a square body portion 31 adapted to be received in a square work-receiving opening H2 of a spring collet C2 and said body portion defining a square workpiece-receiving bore or opening 32. The body portion 31 terminates at its inner end in a square peripheral rib 33 having sloping faces 34 corresponding to the face 3' to facilitate removal of the bushing from a collet, and its outer end terminates in a flange 35. Longitudinal slits 36, 36 extending from the inner end of the bushing terminate adjacent to the flange 35 and alternately arranged longitudinal slits 37, 37 extend through the flange 35 and through the body to a point adjacent to the rib 33 of the bushing to form the bushing into a series of work-gripping jaw components. Incidentally, the collet C2 is shown as having four jaws G2 formed by slits F2 to indicate that the number of jaws of the collets with which bushings of the present invention may be used may be of any number of two or more, the more common numbers of jaws for spring collets being three, four and six.

In the foregoing portion of the specification, the different forms of the invention in FIGS. 1–8 relating to a bushing having a cylindrical body portion are regarded as constituting a first embodiment while those forms of the invention shown in FIGS. 9–12 showing bushings having a non-cylindrical body are considered as representing a second embodiment. FIGS. 13, 14 and 15 relate to a third embodiment of the invention intended to acmodate conditions in which the workpiece is gripped by a bushing having a cylindrical body surface wherein relative rotation between the bushing and the collet is to be avoided. In this embodiment, the outer end of the collet C3 is formed generally normal to the axial line of the collet and is provided with a threaded hole 40 in one of the jaws thereof which is engaged by the threaded body 41 of a screw 42 having a larger diameter head 43 which thus forms a driving key engageable with a notch 44 in the flange 5' in a bushing 1' inserted in the collet which thus allows independent radial movement of the bushing and collet jaws while preventing relative rotative movement between the bushing and the collet. This driving arrangement would not be required where the exterior of the bushing body and the portion of the collet engaged thereby were non-circular, and as a general thing would not be required even where the interengaging surfaces were round.

A particular advantage of this invention is that the strength and accuracy of a metal collet (usually steel)

is preserved with the added advantage of a non-marring workpiece engaging surface.

The invention thus disclosed by certain presently preferred examples shall not be deemed to be limited to the specific embodiments described and will be understood to include all such changes in construction and materials as shall come within the purview of the appended claims.

I claim:

1. As an article of manufacture, a bushing removably insertable in a spring collet for holding a workpiece in the collet, said bushing being formed from a material having a workpiece engaging surface which is softer than the surface of the workpiece to be held by said bushing and said bushing including a body portion having an outer circumferential surface conforming to the work engaging surface of the collet and an inner circumferential surface conforming to the configuration of the portion of the workpiece to be engaged thereby, a collet nose engaging flange at one end of said body portion, and a peripheral rib extending radially outwardly from the outer surface of the opposite end of said body portion adapted to engage the shoulder within the collet formed by the juncture of the work engaging surface of the collet with the larger axial bore which extends to the adjacent end of the collet and cooperating with said flange to hold said bushing in the collet against unintended removal, said bushing further having a plurality of longitudinal slits formed therein and extending in alternation from opposite ends of said bushing whereby said bushing is rendered compressible in response to constriction thereof by the collet to be caused to grip a workpiece inserted in said bushing.

2. A workpiece holding bushing as claimed in claim 1 in which said peripheral rib slopes outwardly from the outer surface of said body portion to the radially outermost portion of said rib.

3. A workpiece holding bushing as claimed in claim 1 in which said flange is provided with means engageable with an abutment on the collet operative to prevent relative rotative movement between the collet and said bushing.

4. A workpiece holding bushing as claimed in claim 1 in which the inner and outer circumferential surfaces of said body portion are circular and are coaxially disposed.

5. A workpiece holding bushing as claimed in claim 1 in which the outer surface of said body portion is non-circular and operative to non-rotatively engage the interior surface of the collet.

6. A workpiece holding bushing as claimed in claim 5 in which said rib has the same non-circular configuration as the surface of the non-circular body portion.

7. A workpiece holding bushing as claimed in claim 1 in which said slits are disposed between the corners defining the sides of said non-circular configuration of said body portion.

8. A workpiece holding bushing as claimed in claim 5 in which said workpiece engaging surface is non-circular and in which said slits are disposed at the corners of said non-circular workpiece engaging surface.

References Cited

UNITED STATES PATENTS

| | | | |
|---|---|---|---|
| 1,125,780 | 1/1915 | Waite | 279—51 |
| 2,228,685 | 1/1941 | Benjamin | 279—49 |
| 2,994,539 | 8/1961 | Farnsworth | 279—51 |

ROBERT C. RIORDON, *Primary Examiner.*

D. R. MELTON, *Assistant Examiner.*